United States Patent
Meza et al.

(10) Patent No.: US 10,961,372 B2
(45) Date of Patent: Mar. 30, 2021

(54) RUBBER COMPOSITION CONTAINING DUAL POLYBUTADIENE ELASTOMERS WITH BALANCED FILLER REINFORCEMENT NETWORK, PREPARATION AND TIRE WITH COMPONENT

(71) Applicant: The Goodyear Tire & Rubber Company, Akron, OH (US)

(72) Inventors: Roberto Cerrato Meza, North Canton, OH (US); Junling Zhao, Hudson, OH (US); Warren James Busch, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 50 days.

(21) Appl. No.: 16/263,578

(22) Filed: Jan. 31, 2019

(65) Prior Publication Data
US 2020/0247981 A1    Aug. 6, 2020

(51) Int. Cl.
| C08L 9/00 | (2006.01) |
| C08J 3/22 | (2006.01) |
| B60C 1/00 | (2006.01) |
| B60C 11/00 | (2006.01) |

(52) U.S. Cl.
CPC .............. *C08L 9/00* (2013.01); *B60C 1/0016* (2013.01); *B60C 11/0008* (2013.01); *C08J 3/226* (2013.01); *B60C 2011/0025* (2013.01); *C08L 2205/025* (2013.01); *C08L 2205/03* (2013.01); *C08L 2310/00* (2013.01)

(58) Field of Classification Search
CPC .. C08L 9/00; C08L 2205/025; C08L 2205/03; C08L 2310/00; B60C 1/0016; B60C 11/0008; B60C 2011/0025; C08J 3/226
USPC ........................................................ 524/526
See application file for complete search history.

(56) References Cited

U.S. PATENT DOCUMENTS

| 5,451,646 | A | 9/1995 | Castner ..................... C08F 4/70 |
| 5,567,784 | A | 10/1996 | Wieder et al. ............ C08C 2/00 |
| 5,696,197 | A * | 12/1997 | Smith ..................... C08J 3/226 |
| | | | 524/495 |
| 5,773,504 | A * | 6/1998 | Smith ..................... B29B 7/007 |
| | | | 524/492 |
| 6,127,468 | A | 10/2000 | Cruse et al. ............. C08K 5/49 |
| 6,204,339 | B1 | 3/2001 | Waldman et al. ....... C08C 19/26 |
| 6,414,061 | B1 | 7/2002 | Cruse et al. ......... C08K 5/5419 |
| 6,528,673 | B2 | 3/2003 | Cruse et al. ............. C07F 7/06 |
| 6,608,125 | B2 | 8/2003 | Cruse et al. ............. C01F 7/18 |
| 9,260,594 | B2 * | 2/2016 | Fuchs ..................... C08L 21/00 |
| 9,518,158 | B1 | 12/2016 | Meza et al. ............... C08J 5/00 |
| 9,890,270 | B2 | 2/2018 | Forciniti et al. .......... C08L 9/00 |
| 10,053,560 | B2 | 8/2018 | Zartman et al. .......... C08L 9/00 |

(Continued)

OTHER PUBLICATIONS

European Search Report for Serial No. EP20153097 dated Jul. 1, 2020.

*Primary Examiner* — Josephine L Chang
(74) *Attorney, Agent, or Firm* — John D DeLong; Henry C. Young

(57) ABSTRACT

The invention relates to preparation of a rubber composition which contains polybutadiene elastomers with balanced reinforcing filler network, rubber composition prepared thereby and tire with at least one component comprised of such rubber composition.

14 Claims, 1 Drawing Sheet

Balanced Batch Mixing

(56) References Cited

U.S. PATENT DOCUMENTS

| | | |
|---|---|---|
| 2006/0106149 A1 | 5/2006 | Sandstrom et al. |
| 2011/0226396 A1 | 9/2011 | Zhang et al. |
| 2013/0340912 A1* | 12/2013 | Zhao .................. C08K 3/04 |
| | | 152/543 |
| 2015/0251491 A1* | 9/2015 | Zhao .................. C08L 7/00 |
| | | 152/209.5 |
| 2016/0319112 A1 | 11/2016 | Vallat et al. |
| 2017/0101525 A1* | 4/2017 | Forciniti .............. C08K 3/04 |
| 2018/0066128 A1 | 3/2018 | Zartman et al. |

* cited by examiner

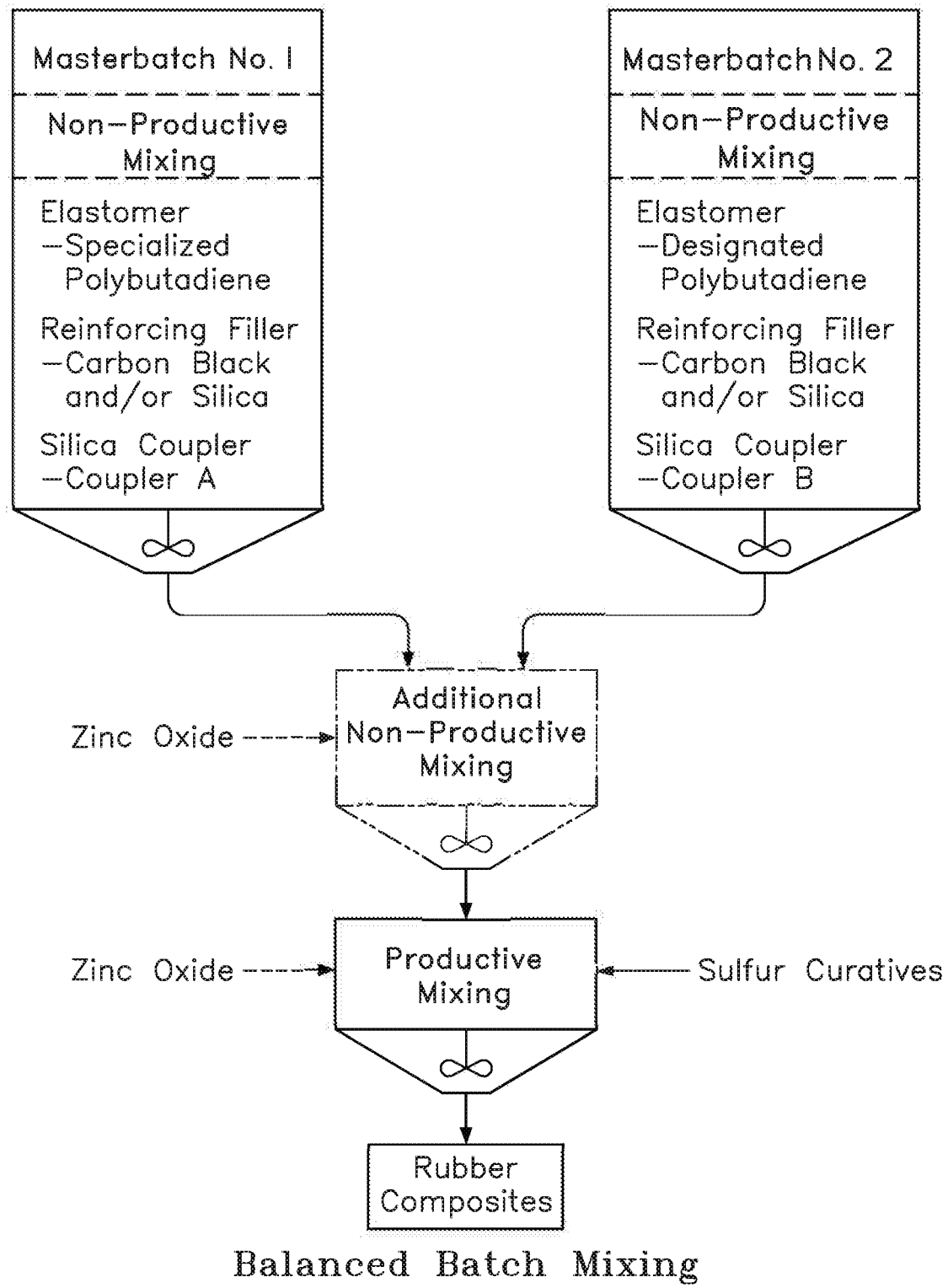
Balanced Batch Mixing

RUBBER COMPOSITION CONTAINING DUAL POLYBUTADIENE ELASTOMERS WITH BALANCED FILLER REINFORCEMENT NETWORK, PREPARATION AND TIRE WITH COMPONENT

FIELD OF THE INVENTION

The invention relates to a rubber composition containing dual polybutadiene elastomers with balanced filler reinforcement network, preparation of such rubber composition and tire with at least one component thereof such as, for example, a tire tread.

BACKGROUND OF THE INVENTION

Tires may be prepared with treads comprised of diene-based rubber compositions which contain reinforcing filler as a combination of rubber reinforcing carbon black and precipitated silica. The precipitated silica may be used together with a silica coupler to couple the precipitated silica to diene-based elastomers contained in the rubber composition.

The rubber composition may, for example, contain dual polybutadiene elastomers. For example, see U.S. Pat. No. 9,518,158.

The rubber composition may, for example, be a phase mixed rubber composition. For example, see U.S. Pat. No. 9,890,270.

It may sometimes be desired to promote increasing stiffness as well as abrasion resistance of a cured rubber composition for a tire component, such as for example a tire tread as indicated by its cured storage modulus G' property and abrasion resistance as indicated DIN or Grosch abrasion properties, while substantially maintaining or beneficially reducing its internal hysteresis as indicated by its rebound and/or tangent delta (tan delta) properties.

An increase in such stiffness property of a rubber composition may often be expected to increase its hysteresis property which, in turn, may be expected to promote an undesirable increase in internal heat generation for the tire tread during the tire's operational service. An increase in such hysteresis property may be indicated, for example, by a decrease in the rubber composition's rebound property, particularly its hot (100° C.) rebound property, and/or an increase in its tangent delta (tan delta) property.

A challenge is presented to promote an increase in a cured rubber composition's stiffness (e.g. an increase in the cured rubber composition's storage modulus G' property) as well as its abrasion resistance while substantially maintaining or improving (reducing) its hysteresis property, particularly for a tire tread rubber composition, as well as desirably substantially maintaining the uncured rubber's processability.

For such challenge, it is desired to evaluate providing the rubber composition as a composite of a blend of rubber masterbatches individually comprised of combinations of polybutadiene elastomer(s) and reinforcing filler selected from rubber reinforcing carbon black and/or precipitated silica together with associated combinations of silica couplers.

It is proposed for the overall tread rubber to contain diene-based elastomers comprised of dual cis 1,4-polybutadiene elastomers, optionally containing additional diene-based elastomer such as, for example, at least one of cis 1,4-polyisoprene rubber (natural or synthetic rubber), styrene/butadiene rubber, isoprene/butadiene rubber and 3,4-polyisoprene with variations of reinforcing filler comprised of rubber reinforcing carbon black, precipitated silica, or their combination, together with variations in silica coupling agents for the precipitated silica. Such dual polybutadiene elastomers are referred to herein, for convenience, as a specialized polybutadiene elastomer and as a designated polybutadiene elastomer.

The specialized polybutadiene elastomer is the product of polymerization of 1,3-butadiene monomer in an organic solvent with catalyst comprised of an organonickel compound with attendant physical properties.

The designated polybutadiene elastomer is the product of polymerization of 1,3-butadiene monomer in an organic solvent with catalyst comprised of a neodymium compound with attendant physical properties.

In practice, it is recognized that a reinforcing filler, such as rubber reinforcing carbon black and precipitated silica, has a preferential reinforcing affinity for the first diene-based elastomer with which it is mixed such as, for example, the specialized or designated cis 1,4-polybutadiene elastomer.

For this evaluation, it is desired to provide rubber compositions comprised of at least one of rubber reinforcing carbon black and precipitated silica with specialized cis 1,4-polybutadiene elastomer and with designated cis 1,4-polybutadiene elastomer followed by blending the specialized and designated cis 1,4-polybutadiene containing rubber compositions.

For this evaluation, it is further desired to provide dual silica couplers for the rubber compositions as bis(3-triethoxysilylpropyl) polysulfides with varied polysulfide contents.

The silica couplers are referred to herein, for convenience, as a specialized silica coupler having an average in a range of from about 3 to about 4 (e.g. about 3.2 to about 3.8) connecting sulfur atoms in its polysulfidic bridge provided for said specialized cis 1,4-polybutadiene elastomer in said first masterbatch.

Representative example of such specialized silica coupler is Si69™ from Evonik.

A silica coupler referred to as a designated silica coupler having a relatively reduced average in a range of from about 2 to about 2.6 connecting sulfur atoms in its polysulfidic bridge is provided for said designated cis 1,4-polybutadiene elastomer in said second masterbatch. Representative example of such designated silica coupler is Si266™ from Evonik.

It is intended that the silica couplers are to be used with the precipitated silica contained in the masterbatches although the specialized silica coupler may be used in the first masterbatch if the only reinforcing filler is a rubber reinforcing carbon black since it is believed that the coupler with the higher polysulfide content may promote a degree of beneficial rubber reinforcing interaction with the carbon black.

The specialized cis 1,4-polybutadiene elastomer differs from the designated cis 1,4-polybutadiene elastomer in a sense of having a relatively broad heterogeneity index (number average molecular weight, Mn, divided by its weight average molecular weight, Mw) in which its number average molecular weight (Mn) is relatively low for a cis 1,4-polybutadiene elastomer. Such combination of relatively wide heterogeneity index and relatively low Mn for the specialized cis 1,4-polybutadiene elastomer is believed to be indicative of a branched polymer structure, or configuration, for the elastomer which, in turn, is believed to promote better processability for the uncured elastomer in a sense of lower elastomer viscosity (lower Mooney ML1+4, 100° C. viscosity) and thereby more tolerable of the specialized silica coupler containing the higher connecting sulfur atom content which may promote an increased Mooney viscosity of uncured elastomer.

Representative of such specialized cis 1,4-polybutdiene elastomer is BUD4001™ from The Goodyear Tire & Rubber Company.

The designated cis 1,4-polybutadiene elastomer differs from the specialized cis 1,4-polybutadiene elastomer in a sense of having a relatively narrower heterogeneity index (number average molecular weight, Mn, divided by its weight average molecular weight, Mw) in which its number average molecular weight (Mn) is not relatively low for a cis 1,4-polybutadiene elastomer as compared to the specialized cis 1,4-polybutadiene. Such combination of relatively narrower heterogeneity index and higher Mn for the designated cis 1,4-polybutadiene elastomer is believed to be promotive of a higher uncured elastomer viscosity (higher Mooney ML1+4, 100° C. viscosity) and thereby less tolerable of the specialized silica coupler containing the higher connecting sulfur atom content which may promote an increased Mooney viscosity of uncured elastomer and more tolerable of the designated silica coupler containing the lower connecting sulfur atom content which may have a reduced tendency to promote an increased Mooney viscosity of uncured elastomer.

Representative of such designated cis 1,4-polybutdiene elastomer is BUD1223™ from The Goodyear Tire & Rubber Company.

The purpose of the evaluation is to evaluate providing a dual polybutadiene elastomer composition (specialized and designated polybutadiene elastomers) together with dual silica couplers (specialized and designated silica couplers associated with the specialized and designated cis 1,4-polybutadiene elastomers, respectively) and rubber reinforcing fillers to provide a rubber composition containing a complex reinforcing filler network.

In practice, it is recognized that a reinforcing filler (e.g. the rubber reinforcing carbon black and precipitated silica) has a preferential reinforcing affinity for the first diene-based elastomer with which it is associated such as by mixing therewith. It is believed that such preferential reinforcing filler reinforcement phenomenon is understood by those having skill in such art.

For this evaluation, it is therefore desired to individually and separately promote such preferential reinforcing affinities of such reinforcing fillers with the respective selective and designated cis 1,4-polybutadiene elastomers (with associated specialized and designated silica couplers) by the preparation of the two individual rubber masterbatches followed by blending them together.

In this manner then, for the blended elastomer composition, it is envisioned that the indicated reinforcing filler may maintain a greater preferential reinforcing affinity for the specialized cis 1,4-polybutadiene rubber of the first masterbatch and the indicated reinforcing filler maintains a greater preferential reinforcing affinity for the designated cis 1,4-polybutadiene rubber of the second masterbatch, within the blended elastomer composition (blended masterbatches).

It is further believed that restricting the silica couplers to the specialized silica coupler for the specialized cis 1,4-polybutadiene elastomer containing first masterbatch and the designated silica coupler for the designated cis 1,4-polybutadiene containing second masterbatch further promotes the aforesaid affinities of the respective reinforcing filler to the individual rubber compositions to aid in promoting a complex reinforcement network.

As a result, for the blend of the rubber masterbatches, it is further envisioned that only a limited migration of the filler reinforcement of the specialized cis 1,4-polybutadiene rubber based first masterbatch may occur into the filler reinforcement of the designated cis 1,4-polybutadiene rubber based second masterbatch and vice-versa.

The rubber composition comprised of the blend of the rubber masterbatches, together with sulfur curative, may then be shaped to form a tire component such as a tire tread and sulfur cured, together with assembled tire components, to form the tire.

It is important to appreciate that such preparation of the rubber composition network for this evaluation is intended to be a significant departure from a more simple step-wise sequential mixing of precipitated silica and rubber reinforcing carbon black reinforcing fillers in a rubber composition and from a more simple mixing of elastomers and reinforced fillers.

The term "phr" where used herein, and according to conventional practice, refers to "parts of a respective material per 100 parts by weight of rubber, or elastomer".

The terms "rubber" and "elastomer" where used herein, are to be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art. The terms "vulcanize" and "cure" where used therein are used interchangeably unless otherwise indicated.

The terms "specialized" and "designated" are arbitrary terms used herein to distinguish between cis 1,4-polybutadiene elastomers and between silica couplers (silica coupling agents).

SUMMARY AND PRACTICE OF THE INVENTION

In accordance with this invention, a method for preparation of a sulfur curable rubber composition comprised of dual cis 1,4-polybutadiene rubbers, reinforcing filler comprised of a combination of rubber reinforcing carbon black and precipitated silica together with dual silica couplers, based on parts by weight per 100 parts by weight rubber (phr):

(A) preparation of a first masterbatch comprised of specialized cis 1,4-polybutadiene elastomer, filler reinforcement comprised of at least one of rubber reinforcing carbon black and precipitated silica and specialized silica coupler, (B) preparation of a second masterbatch comprised of designated cis 1,4-polybutadiene elastomer, filler reinforcement comprised of at least one of rubber reinforcing carbon black and precipitated silica and designated silica coupler, and (C) blending said first and second masterbatch together followed by addition of zinc oxide and sulfur curatives comprised of sulfur and at least one vulcanization accelerator to said blend, wherein said blend contains reinforcing filler comprised of a combination of said rubber reinforcing carbon black and precipitated silica, wherein at least one of said masterbatches contains fatty acids for reaction with said subsequently added zinc oxide, wherein representative of said fatty acids are, for example, at least one of stearic, palmitic, oleic acid and linoleic acid, wherein said specialized cis 1,4-polybutadiene elastomer is the product of 1,3-butdiene polymerized by nickel based catalysis and representative of said cis 1,4-polybutadiene elastomer is BUD4001™ from The Goodyear Tire & Rubber Company, wherein said designated cis 1,4-polybutadiene elastomer is the product of 1,3-butdiene polymerized by neodymium based catalysis and representative of said cis 1,4-polybutadiene elastomer is BUD1223™ from The Goodyear Tire & Rubber Company, wherein said specialized silica coupler is a bis (3-triethoxysilylpropyl) polysulfide having an average of from about 3.2 to about 3.8 connecting sulfur atoms in its polysulfidic bridge and representative of said coupler is Si69™ from Evonik, and wherein said designated silica coupler is a bis (3-triethoxysilylpropyl) polysulfide having an average of from about 2 to about 2.6 connecting sulfur atoms in its polysulfidic bridge and representative of said coupler is Si266™ from Evonik.

Exemplary of the method of this invention may be, for example and not intended to be limiting, based on parts by weight per 100 parts by weight rubber (phr) in each of rubber first and second composition masterbatches;

(A) preparation of a first rubber masterbatch comprised of about 30 to about 90, alternately about 50 to about 80, phr of said specialized cis 1,4-polybutadiene elastomer and about 10 to about 70, alternately about 20 to about 50, phr of at least one additional diene-based elastomer, about 50 to about 100 phr filler reinforcement comprised of at least one of rubber reinforcing carbon black and precipitated silica and said specialized silica coupler, (B) preparation of a second rubber masterbatch comprised of about 30 to about 90, alternately about 50 to about 80, phr of said designated cis 1,4-polybutadiene elastomer and about 10 to about 70, alternately about 20 to about 50, phr of at least one additional diene-based elastomer, about 50 to about 100 phr filler reinforcement comprised of at least one of rubber reinforcing carbon black and precipitated silica and said designated silica coupler, and (C) blending said first and second masterbatch together, followed by addition of zinc oxide and sulfur curatives comprised of sulfur and at least one vulcanization accelerator to said blend, wherein said bend contains reinforcing filler comprised of a combination of rubber reinforcing carbon black and precipitated silica and wherein at least one of said masterbatches contains fatty acids for reaction with said subsequently added zinc oxide, and wherein representative of said fatty acids are, for example, at least one of stearic, palmitic, oleic acid and linoleic acid.

In practice, and if desired, said specialized and/or designated silica coupler may be replaced with a silica coupler as an alkoxyorganomercaptosilane. Representative of an alkoxyorganomercaptosilane is, for example and not intended to be limiting, a mercaptopropyltriethoxysilane.

For such practice, at least one of said specialized and designated silica coupler is replaced with a silica coupler comprised of an alkoxyorganomercaptosilane which, for replacement of said specialized silica coupler, from about zero to about 60 percent of its mercapto groups are capped and for replacement of said designated silica coupler, from about 60 to about 100 percent of its mercapto groups are capped to thereby reduce its activity until processing of the rubber composition at an elevated temperature.

The mercapto functionality of the alkoxyorganomercaptosilane is capped, or blocked, to reduce its activity until processing of the rubber composition, a practice which is well known to those having skill in such practice. For example and not intended to be limiting, such capped alkoxyorganomercaptosilane might be referred to as a blocked alkoxyorganomercaptosilane (e.g. blocked mercaptopropyltriethoxysilane) in which its mercapto functionality has been blocked by a moiety which is itself labile and in which the blocked mercapto functionality may be deblocked under the rubber vulcanization conditions including an elevated temperature to provide a rubber reactive mercapto functionality. For example, see U.S. Pat. Nos. 6,127,468, 6,204,339, 6,414,061, 6,528,673 and 6,608,125.

The zinc oxide is provided for reaction with fatty acids in situ within said blend of masterbatches without addition of the zinc oxide to either of the two individual masterbatches. The fatty acids may be contained in either or both of said masterbatches or may be an addition to said masterbatch blend. Representative of such fatty acids are primarily at least one of stearic acid, palmitic acid, oleic acid and linoleic acid. A significance of restricting the zinc oxide to the masterbatch blend instead of any individual masterbatch is to retard or prevent an interference of said zinc oxide with an interaction of either of said couplers with said precipitated silica or said rubber reinforcing black.

For the specialized cis 1,4-polybutadiene rubber, it is envisioned that the cis 1,4-polybutadiene rubber may be the product of organic solvent solution polymerization of 1,3-butadiene monomer in the presence of an organonickel based catalyst, particularly a catalyst comprised of an organonickel compound, and an organoaluminum compound, and optionally may include a fluorine-containing compound and a parastyrenated diphenylamine which method is exemplified in U.S. Pat. No. 5,451,646. Such catalyst components, as indicated in said U.S. patent, may be composed of nickel octoate, triisobutylaluminum, hydrogen fluoride and parastyrenated diphenylamine. It is considered herein that said specialized cis 1,4-polybutadiene rubber may suitably be prepared by such polymerization without undue experimentation.

For the designated cis 1,4-polybutadiene rubber, it is envisioned that the cis 1,4-polybutdiene rubber may be a product of organic solvent solution polymerization of 1,3-butadiene monomer in the presence of a catalyst comprised of a neodymium compound (which may be used together with, for example, an aluminum alkyl and an aluminum chloride delivering compound) and where the polybutadiene polymer might be coupled, for example, by treating the reaction mixture with, for example, a sulfur chloride such as, for example, disulfur dichloride as mentioned in U.S. Pat. No. 5,567,784. Representative of neodymium compounds for such catalysis of cis 1,3-butadiene monomer might be, for example, neodymium neodecanoate, neodymium octanoate or neodymium versalate. The neodymium compounds might be derived from a neodymium carboxylate soap such as, for example $Nd(R—COO)_3$. Representative of aluminum alkyl compounds may be, for example, comprised of triisobutylaluminum (TIBA) or diisobutylaluminum hydride (DIBAH). Representative of aluminum chloride delivering compounds may be, for example, diethylaluminum chloride, all so long as the specialized polybutadiene elastomer possesses the aforesaid microstructure, molecular weight and heterogeneity index and Tg ranges. Therefore, the catalyst for preparation of said designated polybutadiene elastomer is exclusive of titanium, cobalt or nickel based catalysts sometimes used for preparation of cis 1,4-polybutadiene elastomers.

The said specialized cis 1,4-butadiene rubber for said first masterbatch has a microstructure comprised of about 90 to about 99 percent cis 1,4-isomeric units, a number average molecular weight (Mn) in a range of from about 90,000 to about 180,000 and a heterogeneity index (Mw/Mn), weight average molecular weight over number average molecular weight, in a range of from about 2.5/1 to about 5/1 (a relatively high heterogeneity index range illustrating a significant difference between its number average and weight average molecular weights).

The said designated cis 1,4-butadiene rubber for said second masterbatch has a microstructure comprised of about 96 to about 99 percent cis 1,4-isomeric units, a number average molecular weight (Mn) in a range of from about 200,000 to about 300,000 and a heterogeneity index (Mw/Mn) in a range of from about 1.5/1 to about 2/1 (a relatively narrow heterogeneity index range illustrating a significant similarity between its number average and weight average molecular weights).

For this evaluation, a purpose of inclusion of the designated cis 1,4-polybutadiene with its relatively high number average molecular weight, relative low homogeneity index and somewhat low Tg is to promote higher rebound values for the rubber composition which is predictive of less internal heat generation, and therefore less temperature build-up, for the rubber composition when it is being worked and predictive of better (lower) rolling resistance for a tire with a tread of such rubber composition which contains the specialized polybutadiene rubber. A further purpose is to promote greater abrasion resistance of the rubber composition which is predictive of better resistance to tread wear for a tire with such rubber composition which contains the specialized polybutadiene rubber.

The specialized cis 1,4-polybutadiene elastomer is believed to have degree of branched configuration which is understood to promote processability in its unvulcanized state.

A feature of the evaluation of providing said specialized silica coupler for the precipitated silica in the first masterbatch as a bis(3-triethoxysilylpropyl) polysulfide having a higher average of about 3.2 to about 3.8 connecting sulfur atoms in its polysulfidic bridge, is to provide such coupler for the precipitated silica with the specialized cis 1,4-polybutadiene to promote a better filler dispersion within the rubber composition and to promote a beneficial increase in reinforcing filler/elastomer interaction which might potentially translate to improved (increased) abrasion resistance in a form of improved (increased) tread wear resistance with a desire to reduce or maintain hysteresis of the rubber composition to thereby reduce or minimize any increase in internal heat generation in a tire's rubber component, such as a tread, during tire service.

A feature of the evaluation of providing said designated silica coupler for the precipitated silica in the second masterbatch as a bis(3-triethoxysilylpropyl) polysulfide having a reduced average of about 2 to about 2.6 connecting sulfur atoms in its polysulfidic bridge is to provide such coupler for the precipitated silica with the designated cis 1,4-polybutadiene to promote a better rubber processing result (without promoting a significant increase in its uncured Mooney (1+4) 100° C. viscosity.

A feature of the evaluation of subsequent addition of zinc oxide to the blend of said first and second masterbatches is to reduce, retard or eliminate allowing the zinc oxide from interfering with the silica coupler/interaction with precipitated silica and possibly the rubber reinforcing carbon black.

In practice, it is understood that, if it may be desired and appropriate, a small additional amount of precipitated silica (e.g. up to about 8 or 10 phr thereof) may optionally, and if desired, be added to said blend of first and second masterbatches.

In practice, if desired and appropriate, a minor amount of additional diene-based rubber (exclusive of styrene containing rubber) may be added to at least one of said first masterbatch or second masterbatches to the blend of first and second masterbatches (e.g. up to about 15 phr thereof). Representative of such additional diene-based rubber is, for example, cis 1,4-polyisoprene rubber.

In practice, it is understood that that one or more of various rubber compounding ingredients including, for example, fatty acid (e.g. at least one of stearic, palmitic and oleic acids), resins and processing aids would be added to any of the masterbatches or to their blend as may be appropriate and desired to react with the zinc oxide in situ within the rubber composition to form a zinc salt thereof.

A rubber composition is provided as being prepared by said method. Said method further comprises shaping and sulfur curing the blend of masterbatches to form a sulfur cured rubber composition or shaped and cured composite (e.g. tread) of a tire.

A sulfur cured rubber composition is thereby provided by said method.

In further accordance with this invention, a tire is provided having a component (e.g. a tire tread) comprised of the shaped and sulfur cured composite of this invention.

In one embodiment, the rubber reinforcing carbon black may be characterized by having an iodine value (ASTM D1510) in a range of from about 70 to about 190 together with a dibutylphthalate (DBP) value (ASTM D2414) in a range of from about 80 to about 140. Representative of such rubber reinforcing carbon blacks are, for example, and not intended to be limiting, N121, N120, N220, N134 and N234 which are ASTM designations.

In one embodiment, each of said first and second masterbatches is individually mixed (non-productive mixing) to a temperature in a range of from about 140° C. to about 170° C.

In one embodiment, said first and second masterbatches are mixed together, or their blend is mixed together, with sulfur curatives (productive mixing with sulfur and at least one sulfur vulcanization accelerator) to a temperature in a range of from about 100° C. to about 130° C.

In one aspect of the invention, a rubber composition is provided as being prepared by the method of this invention.

In additional accordance with this invention, a tire is provided having at least one component comprised of such rubber composition, particularly a sulfur cured rubber composition.

In additional accordance with this invention, such tire component is a tire tread.

For this evaluation, a purpose of inclusion of the designated polybutadiene with its relatively high number average molecular weight, relative low homogeneity index and somewhat lower Tg is to promote higher rebound values for the rubber composition which is predictive of less internal heat generation, and therefore less temperature build-up, for the rubber composition when it is being worked and predictive of better (lower) rolling resistance for a tire with a tread of such rubber composition which contains the designated polybutadiene rubber. A further purpose is to promote greater abrasion resistance of the rubber composition which is predictive of better resistance to tread wear for a tire with such rubber composition which contains the designated polybutadiene rubber. A drawing is provided to further describe the invention.

BRIEF DESCRIPTION OF DRAWING

The present invention will be better understood through reference to the following description and the appended drawing, in which:

FIG. 1 illustrates a process of preparing a rubber composition by preparation and blending separate masterbatches of rubber compositions, namely a first masterbatch of a rubber composition containing specialized cis 1,4-polybutadiene rubber with reinforcing filler comprised of a combination of rubber reinforcing carbon black and a specialized silica coupler (A) and a second masterbatch of a rubber composition containing a designated cis 1,4-polybutadiene rubber with reinforcing filler comprised of a combination of rubber reinforcing carbon black and precipitated silica together with a designated silica coupler (B). The two masterbatches are then blended together with sulfur curatives.

THE DRAWING

In FIG. 1 depicting batch mixing, a first masterbatch (identified as "Masterbatch No. 1") is provided by non-productive mixing (identified as "Non-Productive Mixing") of a blend of specialized cis 1,4-polybutadiene elastomer (identified as "Specialized Polybutadiene" rubber), together with other conventional rubber compounding ingredients (not shown in FIG. 1), to include a dispersion of reinforcing filler (identified as "Reinforcing Filler) as a combination of rubber reinforcing carbon black and precipitated silica, together with a specialized silica coupler (identified as "Silica Coupler A").

In FIG. 1, a second masterbatch (identified as "Masterbatch No. 2") is provided by non-productive mixing (identified as "Non-Productive Mixing") of a blend containing designated cis 1,4-polybutadiene elastomer (identified as "Designated Polybutadiene" rubber), together with other conventional rubber compound ingredients (not shown in FIG. 1) to include a dispersion of reinforcing filler (identified as "Reinforcing Filler) as a combination of rubber reinforcing carbon black and precipitated silica, together with a designated silica coupler (identified as "Silica Coupler B").

In FIG. 1, the masterbatches may be blended together in an additional non-productive mixing step (not shown in FIG. 1) followed by a productive mixing step (identified as a "Productive Mixing" step) in which sulfur curatives are added to the rubber composition (identified as "Sulfur Curatives) which is comprised of sulfur and at least one sulfur vulcanization accelerator (the sulfur and accelerator being referenced but not identified in FIG. 1).

Rubber compounding ingredients may be added to the mixing procedure (not shown) such as, for example and not intended to be limiting, zinc oxide and fatty acid.

The zinc oxide compounding ingredient is excluded from the individual masterbatch preparations to therefore allow the silica coupler(s) to initially react with the precipitated silica in the absence of zinc oxide.

In this manner, the zinc oxide is added to the rubber mixture in at least one of an additional (e.g. separate and subsequent) Non-Productive Mixing and said Productive Mixing steps.

In practice, the blend of masterbatches may be comprised of a ratio of Masterbatch No. 1 to Masterbatch No. 2 in various weight ratios such as for example in a range of from about 3/7 to about 7/3 based on the weight ratio of said specialized and designated cis 1,4-polybutadiene elastomers.

It is appreciated that the levels of specialized and designated silica couplers may be adjusted in the individual respective masterbatches according to a desired result for the overall product.

The resulting rubber composition may be shaped and sulfur cured (not shown in FIG. 1) to form a sulfur cured rubber composition which may, for example, be a tire component such as, for example, a tire tread.

The curatives for sulfur curing the rubber composition are curatives conventionally used for sulfur curable elastomers which typically include an addition of free sulfur and one or more appropriate sulfur cure accelerators which may also sometimes include a cure retarder. Such curatives and use thereof for sulfur curable elastomer compositions are well known to those skilled in the art.

It is to be appreciated that the coupling agent, which may be in a liquid form, might be used in conjunction with a carbon black carrier, namely, pre-mixed with a carbon black, particularly a rubber reinforcing carbon black, prior to the addition to the rubber composition, and such rubber reinforcing carbon black can be included in the amount of rubber reinforcing carbon black accounted for in the rubber composition formulation.

It is therefore readily understood by those having skill in the art that the rubber composition would be compounded, as may be appropriate, by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials. Depending on the intended use of the sulfur vulcanizable and sulfur vulcanized material (rubbers), the additives mentioned above are selected and commonly used in conventional amounts.

In the preparation of the rubber composition typical amounts of tackifier resins, if used, may comprise, for example, about 0.5 to about 10 phr, usually about 1 to about 5 phr. Typical amounts of processing aids, if used, may comprise, for example, about 1 to about 10 phr. Such processing aids can include, for example, aromatic, naphthenic, and/or paraffinic processing oils. Typical amounts of antioxidants may comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants, if used, may comprise, for example, about 1 to about 5 phr.

Typical amounts of fatty acids, where used, which can include stearic acid, palmitic acid, oleic acid, linoleic acid or mixtures of one or more fatty acids, can comprise, for example from about 0.5 to about 5 phr.

Often stearic acid is used in a relatively impure state, in a sense of being a blend with additional fatty acids, such as for example palmitic and oleic and possibly linoleic acids, and might sometimes be more commonly referred to in the rubber compounding practice as "fatty acid" when referred to in the description and practice of this invention.

Typical amounts of zinc oxide may comprise, for example, about 1 to about 5 phr. Typical amounts of waxes, usually microcrystalline waxes, if used, may comprise, for example, about 1 to about 5 phr. Typical amounts of peptizers, if used, may comprise, for example, from about 0.1 to about 1 phr. Typical peptizers may be comprised of, for example, pentachlorothiophenol and dibenzamidodiphenyl disulfide.

As indicated, the vulcanization is conducted in the presence of a sulfur vulcanizing agent. Examples of suitable sulfur vulcanizing agents include the elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used, for example, in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e. primary accelerator. Conventionally and preferably, a primary accelerator(s) is used, for example, in total amounts ranging from about 0.5 to about 4, preferably about 0.8 to about 2, phr. In another embodiment, combinations of a primary and a secondary accelerator might be used with the secondary accelerator being used in amounts of, for example, about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures.

Vulcanization retarders might also be used, if desired and appropriate. Various accelerators that may be used are, for example, various amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is generally a guanidine, dithiocarbamate or thiuram compound.

The presence and relative amounts of the above ingredients, other than aforesaid precipitated silicas and associated coupling agents, are not considered to be a primary subject of this invention.

The following examples are provided to further illustrate the invention. The parts and percentages are by weight unless otherwise indicated.

Example I (Comparative Example)

Sequential Mixing of Elastomers and Reinforcing Fillers

Rubber compositions were prepared with dispersed reinforcing filler comprised of a combination of rubber reinforcing carbon black and precipitated silica.

Control rubber Sample A is a control rubber sample containing a combination of rubber reinforcing carbon black and precipitated silica, together with silica coupling agent, simply blended with and dispersed in a combination of cis 1,4-polybutadiene, cis 1,4-polyisoprene and styrene/butadiene elastomers.

Experimental rubber Sample B is a rubber sample comprised of cis 1,4-polyutadiene rubber and natural cis 1,4-polyisoprene rubber to which rubber reinforcing carbon black and precipitated silica where added together with a silica coupling agent.

The general formulation for the rubber Samples A and B are illustrated in the following Table 1 where parts and percentages are by weight unless otherwise indicated.

TABLE 1

| Material | Parts by Weight (phr) |
|---|---|
| Specialized cis 1,4-polybutadiene rubber A[1] | 0 and 75 |
| Designated cis 1,4-polybutadiene rubber B[2] | 0 and 75 |
| Natural (cis 1,4-polisoprene) rubber | 25 |
| Rubber reinforcing carbon black (N121)[3] | 37 |
| Precipitated silica[4] | 27 |
| Specialized silica coupling agent A (Si69) ™[5] | 1.5 |
| Designated silica coupling agent B (Si266) ™[6] | 2 |
| Zinc oxide | 3 |
| Wax, microcrystalline and paraffinic | 2 |
| Fatty acid[7] | 2.8 |
| Sulfur | 1.2 |
| Sulfur cure accelerators[8] | 2 |

[1]Cis 1,4-polybutadiene rubber prepared by solution polymerization with neodymium based catalysis, having a Tg of about -106° C. as BUD1223 ™ from The Goodyear Tire & Rubber Company

[2]Cis 1,4-polybutadiene rubber prepared by solution polymerization with nickel based catalysis, having a Tg of about -106° C. as BUD4001 ™ from The Goodyear Tire & Rubber Company

[3]N121 as an ASTM designation for the rubber reinforcing carbon black

[4]Precipitated silica as a HiSil 160G ™ from PPG

[5]Silica coupler A as Si69 ™ from Evonik, a bis(3-triethoxysilylpropyl) polysulfide with an average of from about 3.2 to about 3.8 connecting sulfur atoms in its polysulfidic bridge, without a carbon black carrier

[6]Silica coupler B as Si266 ™ from Evonik, a bis(3-triethoxysilylpropyl) polysulfide with an average of from about 2 to about 2.6 connecting sulfur atoms in its polysulfidic bridge, without a carbon black carrier

[7]Fatty acid comprised primarily of stearic, palmitic and oleic acids

[8]Sulfur cure accelerators as a sulfenamide and diphenylguanidine

Rubber Samples A and B are illustrated in the following Table 2.

TABLE 2

| | Rubber Samples (phr) | |
|---|---|---|
| Materials | A | B |
| Non-Productive Mixing (NP) | | |
| Specialized cis 1,4-polybutadiene A (by neodymium catalysis) | 75 | 0 |
| Designated cis 1,4-polybutadiene B (by nickel catalysis) | 0 | 75 |
| Natural rubber (cis 1,4-polyisoprene) | 25 | 25 |
| Rubber reinforcing carbon black (N121) | 37 | 37 |
| Precipitated silica | 27 | 27 |
| Silica coupling agents A and B (B added prior to A) | 3.5 | 3.5 |
| Fatty acid | 2.8 | 2.8 |
| Zinc oxide | 3 | 3 |
| Productive Mixing (P) | | |
| Sulfur | 1.2 | 1.2 |
| Sulfur cure accelerators | 2 | 2 |

Various cured and uncured rubber properties of rubber Samples A and B are reported in the following Table 3.

TABLE 3

| Properties | Rubber Samples (phr) | |
|---|---|---|
| | A | B |
| Uncured Rubber Processing | | |
| Uncured storage modulus, G'(KPa) at 15% strain, 100° C., and 0.83 Hertz (lower is better) | 192 | 228 |
| Tire Tread Predictive Handling Properties, Cured Storage Modulus (G')[1] at 100° C.,11 Hertz (KPa) (higher is better) | | |
| 10% strain | 1720 | 1610 |
| 50% strain | 1200 | 1040 |
| Hysteresis Predictive Properties (indicative of predictive reduction in internal heat generation and increase in tread rolling resistance) | | |
| Rebound (100° C.), (higher is better) | 62 | 55 |
| Tan delta, (100° C., 10% strain, 11 Hz). (lower is better) | 0.103 | 0.14 |
| Tire Treadwear Predictive Property, Abrasion Resistance | | |
| Grosch abrasion[2], high, mg/km (rate of abrasion) (lower is better) | 365 | 458 |

From Table 3 it can be seen from this Comparative Example that rubber Sample A utilizing the specialized cis 1,4-polybutadiene rubber exhibited a somewhat reduced uncured processing quality and improved stiffness (tire tread handling quality) as well as improved hysteresis and abrasion resistance qualities as compared to rubber Sample B utilizing the designated cis 1,4-polybutadiene rubber.

Example II

Experimental Masterbatch Mixing of Rubber Compositions

Two separate masterbatches of rubber compositions were prepared in which a specialized cis 1,4-polybutadiene rubber (nickel catalysis preparation) and designated cis 1,4-polybutadiene rubber (neodymium catalysis preparation) were mixed in separate masterbatches with at least one of rubber reinforcing carbon black and precipitated silica together with associated specialized and designated silica couplers.

The specialized cis 1,4-polybutadiene elastomer was an organic solvent solution polymerization prepared cis 1,4-polybtadiene elastomer by nickel catalysis.

The designated cis, 4-polybutadiene elastomer was an organic solvent solution polymerization prepared cis 1,4-polybtadiene elastomer by neodymium catalysis.

The specialized silica coupler was a bis(3-triethoxysilyl-propyl) polysulfide having an average of from about 3.2 to about 3.8 connecting sulfur atoms in its polysulfidic bridge.

The designated silica coupler was a bis(3-triethoxysilyl-propyl) polysulfide having a reduced average of from about 2 to about 2.6 connecting sulfur atoms in its polysulfidic bridge.

In particular, a first masterbatch (MB-1) was prepared as a blend of specialized cis 1,4-polybutadiene elastomer and specialized silica coupler and containing reinforcing filler comprised of a combination of precipitated silica and rubber reinforcing carbon black. In this sense, the first masterbatch did not contain a designated cis 1,4-polybutadiene elastomer and designated silica coupler.

The first masterbatch was prepared without (in the absence of) zinc oxide for a purpose of preventing or retarding an interfering reaction of zinc oxide with the combination of the specialized silica coupler and filler reinforcement.

In particular, a second masterbatch (MB-2) was prepared as a blend of designated cis 1,4-polybutadiene elastomer and designated silica coupler and containing a combination of precipitated silica and rubber reinforcing carbon black. In this sense, the second masterbatch did not contain a specialized cis 1,4-polybutadiene elastomer and specialized silica coupler.

The second masterbatch was prepared without (in the absence of) zinc oxide for a purpose of preventing or retarding an interfering reaction of zinc oxide with the combination of the specialized silica coupler and filler reinforcement.

The first and second masterbatches were blended (MB-1 plus MB-2) together in a weight ratio of 1/1 (based on ratio of said specialized and said designated cis 1,4-polybutadiene elastomers) to which added sulfur curatives comprised of sulfur and sulfur cure accelerator(s) are added.

Zinc oxide was added to THE blend of first and second masterbatches to react in situ within rubber composition with fatty acid(s) provided by the first and/or second masterbatches and/or blend thereof. Such fatty acids may be selected from fatty acids comprised of, for example, at least one of stearic acid, palmitic acid and oleic acid.

The following Table 4 illustrates general formulations for the first masterbatch and second masterbatch and for the resulting blend of the masterbatches (50/50 weight ratio)

Table 4 further shows that the fatty acids were added to each masterbatch and the zinc oxide was subsequently added to the blend of masterbatches and therefore excluded from the individual masterbatches.

A purpose for excluding an addition of the zinc oxide to individual masterbatches was to prevent the zinc oxide from pre-maturely interfering with the precipitated silica/silica coupler interaction.

A purpose for addition of the fatty acids with the masterbatches was to allow the fatty acids to promote better processability of the uncured rubber compositions.

As indicated in the following Table 4, the first and second Master Batches (MB 1 and MB 2) were blended together in a 50/50 weight ratio (1/1 blend of the masterbatches based on the weight ratio of the specialized and designated cis 1,4-polybutadiene elastomers).

TABLE 4

| Materials | MB-1 | MB-2 | MB-1 + MB-2 |
|---|---|---|---|
| Non-productive Mixing Step(s) | | | |
| Specialized cis 1,4-polybutadiene rubber A | 75 | 0 | 37.5 |
| Designated cis 1,4-polybutadiene rubber B | 0 | 75 | 37.5 |
| Natural rubber | 25 | 25 | 25 |
| Carbon black (N121) | 37 | 37 | 37 |
| Precipitated silica | 27 | 27 | 27 |
| Specialized silica coupling agent (coupler A) | 1.5 | 0 | 0.8 |
| Designated silica coupling agent (coupler B) | 0 | 2 | 1 |
| Wax, microcrystalline and paraffinic | 1.5 | 1.5 | 1.5 |
| Fatty acid(s) | 1 | 1 | 1 |
| Additional Non-Productive Mixing Step Subsequent to Blending the Masterbatches | | | |
| Zinc oxide | 0 | 0 | 3 |
| Productive Mixing Step | | | |
| Sulfur | 0 | 0 | 1.2 |
| Sulfur cure accelerators(s) | 0 | 0 | 2.1 |

The materials indicated in Table 4 for the masterbatches have been referenced and identified in Table 1.

Various cured and uncured rubber properties of the 1/1 blend of masterbatches (MB-1 plus MB-2) as well as comparative properties reported in Example I for the rubber Samples A and B, are reported in the following Table 5.

TABLE 5

| Properties | MB-1 + MB-2 | Rubber Samples from Example I | |
|---|---|---|---|
| | | A | B |
| Processing | | | |
| Uncured storage modulus G' at 15% strain, 100° C. and 0.83 Hertz (KPa), lower is better | 194 | 192 | 228 |
| Rubber Properties | | | |
| Tire Tread Predictive Handling Properties, Cured Storage Modulus (G')[1] at 100° C., 11 Hertz (KPa)[1] | | | |
| 10% strain (KPa), higher is better | 1,900 | 1720 | 1610 |
| 50% strain (KPa), higher is better | 1,290 | 1200 | 1040 |
| Hysteresis Properties (predictive of internal heat generation and tire tread rolling resistance) | | | |
| Rebound (100° C.), (higher is better) | 61 | 62 | 55 |
| Tan delta (100° C., 10% strain, 11 Hertz, (lower is better) | 0.108 | 0.103 | 0.14 |
| Tire Treadwear Predictive Property, Abrasion Resistance | | | |
| Grosch abrasion, High, mg/km (rate of abrasion) (lower is better) | 282 | 365 | 458 |

It is seen from Table 5 that processing of the uncured rubber composition blend (MB-1+MB-2) compared favorably with the processing characteristics of Comparative rubber Samples A and B of Example I.

It is further seen that the predictive tire tread handling of the cured blend (MB-1+MB-2) improved over the rubber Samples A and B of Example I.

It is also seen that hysteresis of the cured rubber blend (MB-1+MB-2) compared favorably with rubber Samples A and B of Example I.

It can further be seen that the rate of abrasion was substantially and beneficially reduced as compared to rubber Samples A and B of Example I.

It is concluded that the aforesaid challenge of promoting the cured rubber's stiffness (increase in its storage modulus G' property) as well as increasing its resistance to abrasion was achieved while substantially maintaining its hysteresis as well as without significantly departing from its uncured rubber processing quality While certain representative embodiments and details have been shown for the purpose of illustrating the invention, it will be apparent to those skilled in this art that various changes and modifications may be made therein without departing from the spirit or scope of the invention.

What is claimed is:

1. A method for preparation of a sulfur curable rubber composition comprised of dual cis 1,4-polybutadiene rubbers, reinforcing filler comprised of a combination of rubber reinforcing carbon black and precipitated silica together with dual silica couplers, which comprises:
    (A) preparing a first masterbatch comprised of a blend of specialized cis 1,4-polybutadiene elastomer, filler reinforcement comprised of at least one of rubber reinforcing carbon black and precipitated silica together with a specialized silica coupler,
    (B) preparing a second masterbatch comprised of a blend of designated cis 1,4-polybutadiene elastomer, filler reinforcement comprised of at least one of rubber reinforcing carbon black and precipitated silica together with a designated silica coupler, and
    (C) blending said first and second masterbatch together and followed by subsequently adding zinc oxide and sulfur curatives comprised of sulfur and at least one vulcanization accelerator to the blend of the first and second masterbatches,
    wherein the blend of the first and second masterbatches contains reinforcing filler comprised of a combination of said rubber reinforcing carbon back and precipitated silica,
    wherein said specialized cis 1,4-polybutadiene elastomer is the product of 1,3-butadiene monomer polymerized by organic nickel based catalysis,
    wherein said designated cis 1,4-polybutadiene elastomer is the product of 1,3-butadiene monomer polymerized by neodymium based catalysis,
    wherein said specialized silica coupler is a bis (3-triethoxysilylpropyl) polysulfide having an average of from about 3.2 to about 3.8 connecting sulfur atoms in its polysulfidic bridge,
    wherein said designated silica coupler is a bis (3-triethoxysilylpropyl) polysulfide having an average of from about 2 to about 2.6 connecting sulfur atoms in its polysulfidic bridge,
    wherein at least one of said masterbatches contains fatty acids for reaction with said subsequently added zinc oxide, wherein said fatty acids are comprised of at least one of stearic, palmitic, oleic acid and linoleic acid.

2. The method of claim 1 wherein at least one of said masterbatches contains an additional diene-based elastomer comprised of at least one of cis 1,4-polyisoprene, styrene/butadiene, isoprene/butadiene and 3,4-polyisoprene elastomers.

3. The method of claim 1 comprised of, based on parts by weight per 100 parts by weight rubber (phr) in each of first and second masterbatches:
    (A) preparing the first masterbatch comprised of about 30 to about 90 phr of said specialized cis 1,4-polybutadiene elastomer and about 10 to about 70 phr of at least one additional diene-based elastomer, about 50 to about 100 phr filler reinforcement comprised of at least one of rubber reinforcing carbon black and precipitated silica and said specialized silica coupler,
    (B) preparing the second masterbatch comprised of about 30 to about 90 phr of said designated cis 1,4-polybutadiene elastomer and about 10 to about 70 phr of at least one additional diene-based elastomer, about 50 to about 100 phr filler reinforcement comprised of at least one of rubber reinforcing carbon black and precipitated silica and said designated silica coupler, and
    (C) blending said first and second masterbatch together followed by subsequently adding zinc oxide and sulfur curatives comprised of sulfur and at least one vulcanization accelerator to the blend of the first and second masterbatches, wherein said blend contains reinforcing filler comprised of a combination of said rubber reinforcing carbon back and precipitated silica.

4. The method of claim 3 wherein said additional diene-based elastomer is comprised of at least one of cis 1,4-polyisoprene, styrene/butadiene, isoprene/butadiene and 3,4-polyisoprene elastomers.

5. The method of claim 1 wherein said specialized cis 1,4-polybutadiene elastomer is the product of organic solvent solution polymerization of 1,3-butadiene monomer in the presence of an organonickel based catalyst comprised of an organonickel compound, an organoaluminum compound, which optionally includes at least one of fluorine-containing compound and parastyrenated diphenylamine.

6. The method of claim 2 wherein said specialized cis 1,4-polybutadiene elastomer is the product of organic solvent solution polymerization of 1,3-butadiene monomer in the presence of an organonickel based catalyst comprised of an organonickel compound, an organoaluminum compound, which optionally includes at least one of fluorine-containing compound and parastyrenated diphenylamine.

7. The method of claim 1 wherein said specialized cis 1,4-polybutadiene elastomer has a microstructure comprised of about 90 to about 99 percent cis 1,4-isomeric units, a number average molecular weight (Mn) in a range of from about 90,000 to about 180,000 and a heterogeneity index (Mw/Mn) in a range of from about 2.5/1 to about 5/1.

8. The method of claim 2 wherein said specialized cis 1,4-polybutadiene elastomer has a microstructure comprised of about 90 to about 99 percent cis 1,4-isomeric units, a number average molecular weight (Mn) in a range of from about 90,000 to about 180,000 and a heterogeneity index (Mw/Mn) in a range of from about 2.5/1 to about 5/1.

9. The method of claim 1 wherein said designated cis 1,4-polybutadiene elastomer is the product of organic solvent solution polymerization of 1,3-butadiene monomer in the presence of a catalyst comprised of a neodymium compound, optionally together with an aluminum alkyl compound and an aluminum chloride delivering compound, where said neodymium compound for said catalysis is comprised of at least one of neodymium neodecanoate, neodymium octanoate and neodymium versalate where said aluminum alkyl compound is comprised of triisobutylaluminum (TIBA) or diisobutylaluminum hydride (DIBAH), and where said aluminum chloride delivering compound is diethylaluminum chloride.

10. The method of claim 2 wherein said designated cis 1,4-polybutadiene elastomer is the product of organic solvent solution polymerization of 1,3-butadiene monomer in the presence of a catalyst comprised of a neodymium compound, optionally together with an aluminum alkyl compound and an aluminum chloride delivering compound, where said neodymium compound for said catalysis is comprised of at least one of neodymium neodecanoate, neodymium octanoate and neodymium versalate where said aluminum alkyl compound is comprised of triisobutylaluminum (TIBA) or diisobutylaluminum hydride (DIBAH), and where said aluminum chloride delivering compound is diethylaluminum chloride.

11. The method of claim 1 wherein said designated cis 1,4-butadiene elastomer has a microstructure comprised of about 96 to about 99 percent cis 1,4-isomeric units, a number average molecular weight (Mn) in a range of from about 200,000 to about 300,000 and a heterogeneity index (Mw/Mn), weight average molecular weight to number average molecular weight, in a range of from about 1.5/1 to about 2/1.

12. The method of claim 2 wherein the weight ratio of said first masterbatch to said second masterbatch is in a range of from about 7/3 to about 3/7 based on their respective specialized cis 1,4-polybutadiene and designated cis 1,4-polybutadiene elastomers.

13. The method of claim 1 which further comprises sulfur curing the rubber composition.

14. The method of claim 2 which further comprises sulfur curing the rubber composition.

* * * * *